(12) United States Patent
Ryan et al.

(10) Patent No.: US 7,568,727 B2
(45) Date of Patent: Aug. 4, 2009

(54) AIRBAG DEPLOYMENT MONITORING SYSTEM

(75) Inventors: Sean Ryan, Farmington Hills, MI (US); Mark Cuddihy, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 352 days.

(21) Appl. No.: 10/907,578

(22) Filed: Apr. 6, 2005

(65) Prior Publication Data

US 2006/0226637 A1    Oct. 12, 2006

(51) Int. Cl.
*B60R 21/01* (2006.01)
(52) U.S. Cl. .............. 280/735; 280/728.1; 280/742.2; 356/616; 356/620
(58) Field of Classification Search .......... 280/735, 280/743.2, 731, 732, 728.1; 377/18; 356/614–617, 356/620; 33/707, 706; 250/231.13–231.18
See application file for complete search history.

(56) References Cited

U.S. PATENT DOCUMENTS

| | | | | |
|---|---|---|---|---|
| 3,708,681 A | * | 1/1973 | Ivers .................. 250/231.16 |
| 4,180,703 A | * | 12/1979 | Cialone et al. ......... 250/237 G |
| 4,465,373 A | * | 8/1984 | Tamaki et al. ............... 356/617 |
| 4,554,451 A | * | 11/1985 | Kirstein .................. 250/237 G |
| 4,948,968 A | * | 8/1990 | Matsui .................... 250/237 G |
| 5,233,407 A | * | 8/1993 | Ogata ......................... 356/619 |
| 6,129,379 A | * | 10/2000 | Specht ........................ 280/735 |
| 6,189,928 B1 | * | 2/2001 | Sommer et al. .......... 280/743.2 |
| 6,789,819 B1 | | 9/2004 | Husby |
| 6,793,243 B2 | | 9/2004 | Husby |
| 6,825,654 B2 | * | 11/2004 | Pettypiece et al. .......... 324/166 |
| 6,871,874 B2 | * | 3/2005 | Husby et al. ............. 280/743.2 |
| 6,894,483 B2 | * | 5/2005 | Pettypiece et al. .......... 324/166 |
| 6,951,532 B2 | * | 10/2005 | Ford ............................ 493/407 |
| 2004/0119273 A1 | | 6/2004 | Husby et al. |
| 2004/0155442 A1 | | 8/2004 | Ford et al. |
| 2004/0155443 A1 | | 8/2004 | Ford |
| 2004/0164533 A1 | | 8/2004 | Pettypiece, Jr. |
| 2004/0174156 A1 | | 9/2004 | Pettypiece, Jr. et al. |

\* cited by examiner

*Primary Examiner*—Ruth Ilan
(74) *Attorney, Agent, or Firm*—Frank MacKenzie Brooks Kushman P.C.

(57) ABSTRACT

A system for monitoring the deployment of an airbag. The system includes a sensor adapted to generate a signal and a flexible member having an indicator portion. The indicator portion inhibits at least a portion of the signal from transmitting through the flexible member.

15 Claims, 2 Drawing Sheets

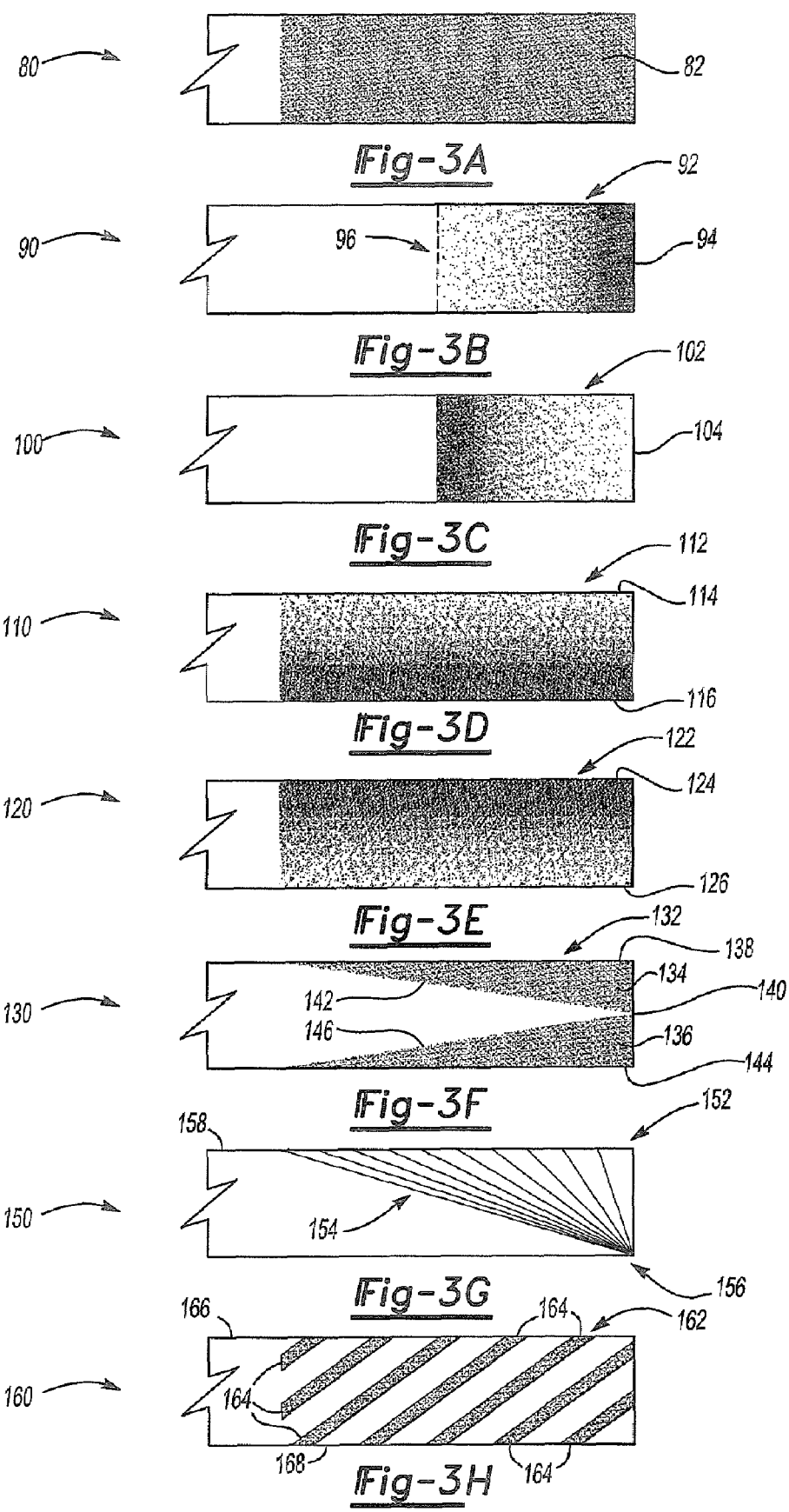

AIRBAG DEPLOYMENT MONITORING SYSTEM

BACKGROUND OF THE INVENTION

1. Field of the Invention

The present invention relates to system for monitoring the deployment of an airbag, and more particularly to a system for monitoring the deployment of an airbag of a motor vehicle.

2. Background Art

Motor vehicles may include one or more airbag modules or deployment systems that deploy an airbag in response to a vehicle impact event. A deployment system may include a monitoring system that monitors deployment of an airbag. Such monitoring systems may detect when an airbag is not fully deployed. An airbag may not fully deploy due to an obstruction, such as an out-of-position occupant, disposed in the airbag deployment path.

Monitoring systems may have various configurations. One type of monitoring system employs a tape that is attached to an interior surface of the airbag. The tape is disposed in a stored position prior to airbag deployment and is pulled by the interior surface when the airbag is deployed. A sensor may detect movement of the tape and generate a signal indicative of the position of the airbag.

Monitoring systems utilizing devices such as tapes may not function properly when the tape is mispositioned during manufacturing or installation. For example, the tape may be partially actuated from its stored position, resulting in a fold or slack disposed between its airbag attachment point and the sensor. This slack region is pulled tight or advanced before subsequent portions of the tape are advanced. Moreover, the tape will not move past the sensor until the slack portion is pulled tight, resulting in inaccurate or untimely detection of airbag deployment and delayed or missed opportunities to alter the airbag deployment sequence.

Before Applicant's invention, there was a need for an improved monitoring system that could accurately detect deployment of an airbag. In addition, there was a need for a monitoring system that could detect slack or mispositioning of a flexible member. In addition, there was a need for a monitoring system that was inexpensive to implement and compatible with high volume manufacturing operations, such as those associated with motor vehicle assembly. Problems associated with the prior art as noted above and other problems are addressed by applicants' invention as summarized below.

SUMMARY OF THE INVENTION

According to one aspect of the present invention, a system for monitoring the deployment of an airbag is provided. The system includes a flexible member and a sensor adapted to direct a signal toward the flexible member. The flexible member includes a first end, a second end disposed proximate the airbag, and an indicator portion. The indicator portion is disposed between the first end and the second end and has a predetermined length. The indicator portion inhibits at least a portion of the signal from transmitting through the flexible member along the predetermined length.

The indicator portion may be shaded along the predetermined length such that the indicator portion is darker than a portion of the flexible member disposed adjacent to the indicator portion. The indicator portion may be shaded by a constant amount.

The indicator portion may be tinted such that the shaded increases or decreases in a direction extending from the first end toward the second end. The indicator portion may be shaded such that the shading increases or decreases in a direction extending between the first and second sided of the flexible member. The amount of shading may correspond to a location along the indicator portion.

According to another aspect of the present invention, an airbag deployment monitoring system is provided. The airbag deployment monitoring system includes an airbag module, a dispenser, a flexible member, and a sensor. The airbag module is adapted to deploy an airbag. The dispenser is disposed proximate the airbag module. The flexible member includes a first end, a second end, and an indicator portion. The first end is disposed proximate to the dispenser. The second end is disposed opposite the first end and proximate the airbag. The indicator portion is disposed near the second end and has a predetermined length. The sensor is disposed near the flexible member. The sensor has a transmitter adapted to project a beam toward the flexible member and a receiver adapted to detect the beam. The indicator portion is shaded along the predetermined length to inhibit at least a portion of the beam from transmitting through the flexible member along the predetermined length.

The indicator portion may include a first shaded section having first, second, and third sides. At least one side may be disposed parallel to the second end. The indicator portion may include a second shaded section having first, second, and third sides. At least one side of the first shaded section may be disposed adjacent to the second shaded section.

According to another aspect of the present invention, an airbag deployment monitoring system is provided. The airbag deployment monitoring system includes an airbag module, a dispenser, a flexible member, and a sensor. The airbag module is adapted to deploy an airbag. The dispenser is disposed proximate the airbag module. The flexible member includes a first end, a second end, and an indicator portion. The first end is disposed proximate the dispenser. The second end is disposed opposite the first end and proximate the airbag. The indicator portion is disposed near the second end and has a plurality of tinted sections. The plurality of tinted sections have at least one side disposed at an angle relative to the second end. The sensor is disposed near the flexible member and has a transmitter adapted to project a light beam toward the flexible member and a receiver adapted to detect the light beam. The plurality of tinted sections are configured to inhibit a portion of the light beam from transmitting through the flexible member.

The plurality of tinted sections may include a set of lines. The members of the set of lines may be disposed parallel to each other or may extend from an intersection point.

The plurality of tinted sections may include first and second shaded sections each having at least three sides.

The indicator portion may have a predetermined length. The plurality of tinted sections may be spaced apart from each other such that at least a portion of the light beam is reflected by at least one tinted section along the predetermined length.

BRIEF DESCRIPTION OF THE DRAWINGS

FIGS. 3A-3H depict fragmentary plan views of various embodiments of the flexible member.

DETAILED DESCRIPTION OF THE PREFERRED EMBODIMENT(S)

Figure 1:
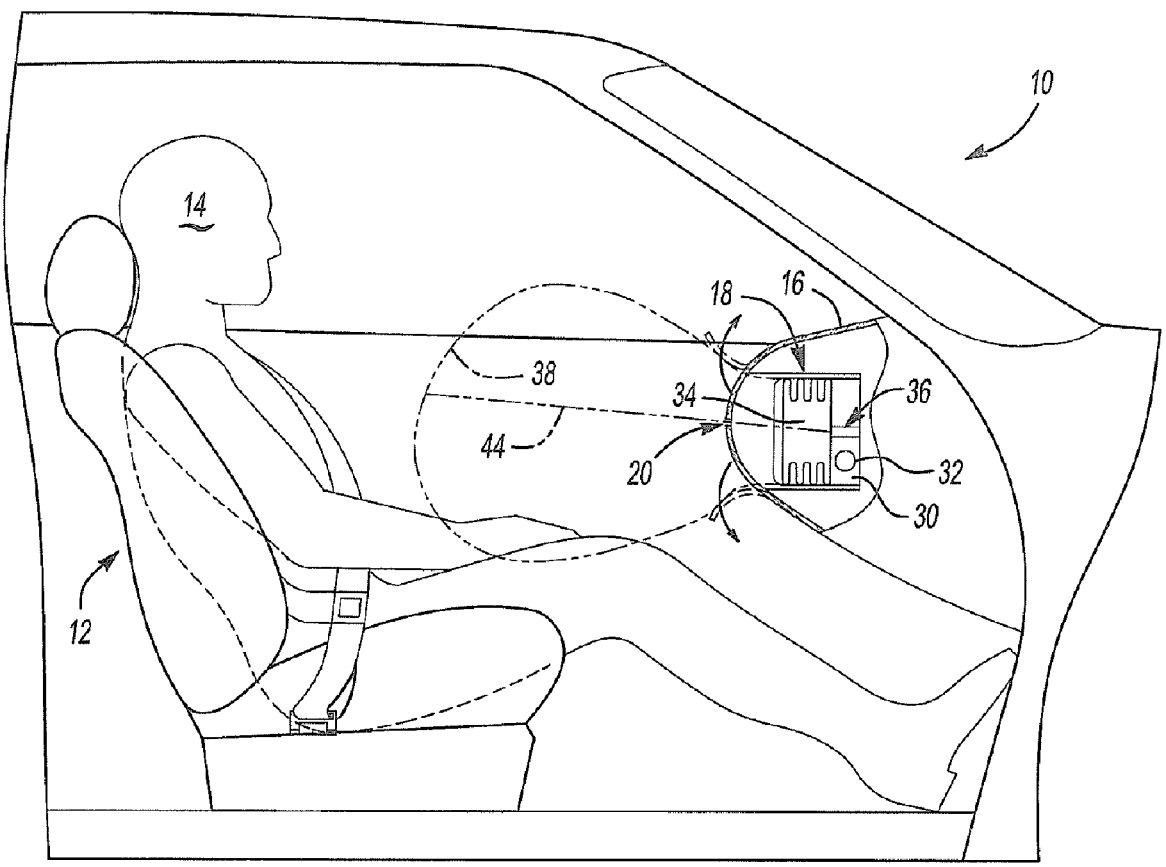
FIG. 1 is a fragmentary side view of a vehicle having an airbag and an airbag deployment monitoring system in accordance with one embodiment of the present invention.

Referring to FIG. 1, a side view of a vehicle 10 is shown. The vehicle 10 includes a seat assembly 12 adapted to receive an occupant 14 and an interior trim panel 16.

The interior trim panel 16 is adapted to conceal an airbag module 18 prior to deployment of an airbag. The interior trim panel 16 may have any suitable configuration. For example, the interior trim panel 16 may include one or more tear seams or deployment doors 20 adapted to permit the airbag to deploy into the vehicle passenger compartment. In the embodiment shown, the interior trim panel 16 is configured as an instrument panel. Alternatively, the interior trim panel 16 and airbag module 18 may be disposed proximate a vehicle steering wheel or may be associated with a side impact airbag system.

The airbag module 18 may have any suitable configuration. In the embodiment shown, the airbag module 18 includes a housing 30, an inflator 32, and an airbag 34, and at least one airbag deployment monitoring system 36.

The housing 30 may be disposed proximate the vehicle 10 in any suitable location. For example, the housing 30 may be disposed proximate a steering wheel mount, seat assembly, structural member, or instrument panel. In the embodiment shown, the housing 30 is coupled to an interior surface of the instrument panel via a chute that is disposed near the deployment doors 20.

The inflator 32 is adapted to provide an inflation gas to the airbag 34. The inflator 32 may be disposed in any suitable location. In the embodiment shown, the inflator 32 is disposed proximate the housing 30. Alternatively, the inflator 32 may be spaced apart from the housing 30 and connected to the airbag 34 via a tube.

The airbag 34 may be connected to the inflator 32 in any suitable manner. For example, the airbag 34 may include an attachment feature, such as a plurality of flaps that define a pocket for receiving the inflator 32. The airbag 34 is adapted to expand from a stored condition to a deployed condition when inflation gas is provided. More specifically, the airbag 34 is deflated and concealed by an interior vehicle surface when in the stored condition and is inflated and positioned between the occupant 14 and the interior vehicle surface when in the inflated condition. In FIG. 1, the airbag 34 is shown in solid lines in the stored condition and is shown in phantom in the deployed condition.

The airbag 34 may have any suitable configuration and may be made of any suitable material. For example, the airbag 34 may have an interior surface 38 and any suitable number of chambers. In addition, the airbag 34 may include one or more tethers that control the shape the airbag 34 upon deployment. The airbag 34 may be assembled in any suitable manner, such as by stitching, bonding, or with an adhesive. Optionally, the airbag 34 may include a friction-reducing coating disposed on an exterior surface to facilitate deployment.

Figure 2:
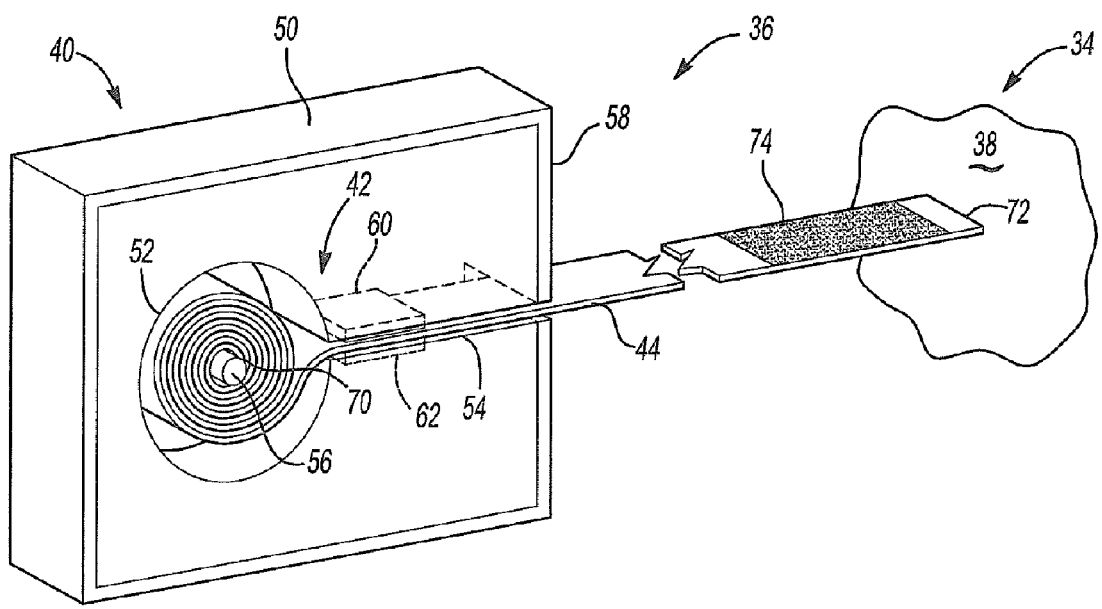
FIG. 2 is a perspective view of an exemplary airbag deployment monitoring system having a flexible member.

Referring to FIGS. 1 and 2, the airbag deployment monitoring system 36 is shown in more detail. The monitoring system 36 may have any suitable configuration. In the embodiment shown, the monitoring system 36 includes a dispenser 40, a sensor 42, and a flexible member 44.

The dispenser 40 may be disposed in any suitable location, such as proximate the airbag module 18. The dispenser 40 may have any suitable configuration. In the embodiment shown in FIG. 2, the dispenser 40 includes a housing 50 having a cavity 52 and a slot 54.

The cavity 52 receives a portion of the flexible member 44 in a manner that facilitates deployment. In the embodiment shown in FIG. 2, the flexible member 44 is wound around a pin or spool 56 disposed in the cavity 52. Alternatively, a portion of the flexible member 44 may be folded or otherwise positioned in the cavity 52 prior to deployment of the airbag 34.

The slot 54 extends between the cavity 52 and a side 58 of the housing 50. The slot 54 may have linear and/or non-linear sections and may be configured to facilitate smooth deployment of the flexible member 44. More specifically, the slot 54 may be designed to inhibit folding or binding of the flexible member 44 within the slot 54.

The sensor 42 may be disposed in any suitable location, such as proximate the slot 54. Alternatively, the sensor 42 may be spaced apart from the dispenser 40. The sensor 42 may be of any suitable type. For example, the sensor 42 may be configured as a magnetic or proximity sensor that is adapted to detect magnetized sections or markings disposed on the flexible member 44. Alternatively, an optical sensor may be employed. In the embodiment shown in FIG. 2, the sensor 42 includes a transmitter 60 and a receiver 62. The transmitter 60 is configured to emit a signal that may be detected by the receiver 62. For instance, the transmitter 60 may be a light source, such as a light emitting diode (LED) that emits visible or non-visible light. The transmitter 60 and receiver 62 may be spaced apart to create a gap through which the flexible member 44 extends. Alternatively, the transmitter 60 and receiver 62 may be disposed in a configuration that permits the receiver 62 to detect a portion of the signal reflected from markings or shaded sections of the flexible member 44. For instance, the transmitter 60 and receiver 62 may be disposed on the same side of the flexible member 44.

The flexible member 44 may have any suitable configuration. For example, the flexible member 44 may be configured as a strip, cord, wire, or tube. In addition, the flexible member 44 may be made of any suitable material, such as metal, a braided or woven material like fabric, metal, or a polymeric material like a polymer-based film. In the embodiment shown, the flexible member 44 is configured as a film that permits visible and/or non-visible light to pass through.

The flexible member may include a first end 70, a second end 72, and an indicator portion 74. The first end 70 is disposed proximate the dispenser 40 and may be attached to the housing 50 or spool 56. The second end 72 is disposed opposite the first end 70 and proximate the interior surface 38 of the airbag 34. The second end 72 may be coupled to the interior surface 38 in any suitable manner, such as with a fastener, stitching, or an adhesive.

The indicator portion 74 may be disposed adjacent to or near the second end 72. In the embodiment shown in FIG. 2, the indicator portion 74 is spaced apart from the second end 72. In addition, the indicator portion 74 may have any suitable length, such as between approximately 10 mm to 100 mm.

The indicator portion 74 includes one or more markings or tinted or shaded sections, generically referred to as shaded sections or shading herein. The shaded sections or markings may be disposed on or integrated with the flexible member 44 in any suitable manner, such as by printing or with an adhesive. The shaded sections or markings are adapted to at least partially block, reflect, or otherwise inhibit the transmission of the signal from the transmitter 60 to the receiver 62. Moreover, the shaded sections or markings may be configured to inhibit transmission of a portion or percentage of the signal from the transmitter 60 to the receiver 62 over the length of the indicator portion 74 as compared to the signal transmissivity associated with unmarked portions of the flexible member 44. The shaded sections or markings may extend the entire length of the indicator portion 74 and may be configured such that the receiver 62 does not detect (and the sensor 42 does not produce) a binary or "on-off" signal when the indicator portion 74 moves past the sensor 42.

The indicator portion 74 may be used to accurately assess the position of the flexible member 44. For example, the indicator portion 74 may be used to detect mispositioning or the presence of slack between the sensor 42 and the airbag 34. Slack may exist when the flexible member 44 is partially advanced from its stored position. In the stored position, at least a portion of the indicator portion 74 is disposed upstream or on the cavity side of the sensor 42. If slack is not present, the sensor 42 will detect the presence and/or movement of the indicator portion 74, thereby indicating that the flexible portion 44 is properly assembled or positioned. If slack is present, the indicator portion 74 may be configured such that it is positioned downstream or past the sensor 42. As a result, the sensor 42 will not detect the markings or the altered signal transmission characteristics associated with the indicator portion 74.

Referring to FIGS. 3A-3H, flexible members are shown having different indicator portion embodiments. In these embodiments, the indicator portions are disposed proximate the attachment point or end of the flexible member. Alternatively, these indicator portions may be spaced apart from the attachment point or end as previously discussed. For convenience, these embodiments are primarily described with reference to a sensor that generates a light beam. However, these embodiments may be made compatible with other types of sensors as previously described.

Referring to FIG. 3A, the flexible member 80 includes an indicator portion 82 that is continuously shaded over its length. The shading is configured to inhibit signal transmissivity compared to unshaded portions of the flexible member 80 as previously discussed. For example, the shading may allow approximately 40% to 60% of the light from the transmitter 60 to pass through the indicator portion 82 to the receiver 62.

Referring to FIG. 3B, the flexible member 90 includes an indicator portion 92 that becomes progressively lighter in a direction extending from an end 94 of the flexible member 90. For example, the indicator portion 92 may be opaque or approximate opaque (e.g., 95% shaded) near the end 94 and may be transparent or approximately transparent (e.g., 5% shaded) near the opposite end 96 of the indicator portion 92. As such, the shading of the indicator portion 92 changes in a direction disposed generally parallel to the direction the flexible member 90 travels when the airbag 34 is deployed. The amount of shading may be proportional to the position along the length of the indicator portion 92. For example, the indicator portion 92 may be approximately 100% shaded at the end 94, decreasing linearly to 50% shaded at the middle of the indicator portion 92 and approximately 0% shaded at end 96. Consequently, for an indicator portion having a predetermined length, the amount of signal transmission may be used to determine or correlated with a location on the indicator portion 92. As such the position of the flexible member 90 relative to the sensor 42 may be quantified.

Referring to FIG. 3C, the flexible member 100 includes an indicator portion 102 similar to that shown in FIG. 3B. In this embodiment, the indicator portion 102 becomes darker or more shaded at distances further away from the end 104 of the flexible member 100.

Referring to FIG. 3D, the flexible member 110 includes an indicator portion 112 that becomes progressively darker in a direction extending from a first side 114 toward a second side 116 of the flexible member 110. For example, the indicator portion 112 may be transparent or approximately transparent (e.g., 5% shaded) near the first side 114 and may be opaque or approximate opaque (e.g., 95% shaded) near the second side 116. As such, the shading of the indicator portion 112 changes in a direction disposed generally perpendicular to the direction the flexible member 110 travels when the airbag 34 is deployed.

Referring to FIG. 3E, the flexible member 120 includes an indicator portion 122 similar to that shown in FIG. 3D. In this embodiment, the indicator portion 122 becomes progressively lighter in a direction extending from a first side 124 toward a second side 126 of the flexible member 120.

Referring to FIG. 3F, the flexible member 130 includes an indicator portion 132 having a first shaded section 134 and a second shaded section 136. In this embodiment, the first and second shaded sections 134,136 each have three sides; however, additional sides may be incorporated. The first shaded section 134 is defined by a first side 138, a portion of a second side 140, and a connecting side 142. Similarly, the second shaded section 136 is defined by a third side 144, a portion of the second side 140, and a connecting side 146. The connecting sides 142,146 may be linear or curved. The first and second shaded sections 134,136 may be opaque or may be shaded in a manner that reduces signal transmission. In the embodiment shown, the first and second shaded sections 134, 136 become smaller, and thereby permit more light transmission, in a direction extending away from the second side 140. Moreover, the first and second shaded sections 134,136 may have the same or different levels of shading. Alternatively, the first and second shaded sections may become smaller in a direction extending toward the second side 140. In addition, the indicator portion may be configured with one shaded section rather than two as shown in FIG. 3F.

Referring to FIG. 3G, the flexible member 150 includes an indicator portion 152 having a set of lines 154. Each member of the set of lines 154 includes a first end positioned at a intersection point 156 and a second end disposed adjacent to an side of the flexible member 150, such as first side 158. In the embodiment shown, the second ends of adjacent lines are spaced apart by approximately equal amounts. Moreover, in this embodiment the set of lines 154 is configured to permit more light transmission in a direction extending away from the end 158 of the flexible member 150. Alternatively, the intersection point 156 may be positioned away from the end 158 to permit more light transmission in a direction extending toward the end 158. In an alternate embodiment, adjacent lines may have included angles that are approximately equal.

Referring to FIG. 3H, the flexible member 160 includes an indicator portion 162 having a plurality of markings 164. The markings 164 may be opaque or shaded in a manner that permits some light transmission. In the embodiment shown, the markings 164 are generally linear and may be spaced apart from each other in a generally parallel relationship. Alternatively, the markings 164 may be curved or have a variety of other configurations, such as a zig-zag or serpentine configuration. Each marking 164 may be spaced apart from another marking by an amount less than the width of the beam generated by the transmitter 60 to inhibit light transmission throughout the indicator portion 162. The markings 164 may be disposed at an angle relative to an side of the flexible member 160 such as an angle of approximately 10° to 90°. For instance, the markings may be angled at approximately 45° to 75° relative to a first side 166 or a second side 168 of the flexible member 160. The markings 164 may be arranged such that at least two markings are intersected by a line drawn perpendicular to (i.e., between first and second sides 166,168) the direction the flexible member 160 travels when the airbag 34 is deployed.

While the best mode for carrying out the invention has been described in detail, those familiar with the art to which this invention relates will recognize various alternative designs and embodiments for practicing the invention as defined by the following claims.

What is claimed is:

1. An airbag deployment monitoring system comprising:
    an airbag module adapted to deploy an airbag;
    a dispenser disposed proximate the airbag module;
    a flexible member including:
        a first end disposed proximate the dispenser,
        a second end disposed opposite the first end and proximate the airbag, and
        an indicator portion disposed at the second end and having a predetermined length, the indicator portion having first and second shading elements having first and second linear sides that extend at an angle from the second end; and
    a sensor disposed near the flexible member, the sensor having a transmitter adapted to project a beam toward the flexible member and a receiver adapted to detect the beam;
    wherein the indicator portion is shaded along the predetermined length to inhibit at least a portion of the beam from transmitting through the flexible member along the predetermined length.

2. The system of claim 1 wherein the indicator portion is shaded along the predetermined length such that the indicator portion is darker than a portion of the flexible member disposed adjacent to the indicator portion.

3. The system of claim 1 wherein the indicator portion includes a point of intersection disposed along the second end.

4. The deployment monitoring system of claim 1 wherein the indicator portion includes a first shaded section having first, second, and third sides.

5. The deployment monitoring system of claim 4 wherein at least one side is disposed parallel to the second end.

6. The deployment monitoring system of claim 5 further comprising a second shaded section having first, second, and third sides.

7. The deployment monitoring system of claim 6 wherein at least one side of the first shaded section is disposed adjacent to the second shaded section.

8. The deployment monitoring system of claim 1 wherein the indicator portion is shaded such that a first shaded area is contiguous with a second shaded area.

9. An airbag deployment monitoring system comprising:
    an airbag module adapted to deploy an airbag;
    a dispenser disposed proximate the airbag module;
    a flexible member including:
        a first end disposed proximate the dispenser,
        a second end disposed opposite the first end and proximate the airbag, and
        an indicator portion disposed near the second end, the indicator portion having a plurality of tinted sections including first and second shaded sections each having at least three sides and each having at least one side disposed at an angle relative to the second end; and
    a sensor disposed near the flexible member, the sensor having a transmitter adapted to project a light beam toward the flexible member and a receiver adapted to detect the light beam;
    wherein the plurality of tinted sections are configured to inhibit a portion of the light beam from transmitting through the flexible member.

10. The deployment monitoring system of claim 9 wherein the first and second shaded sections intersect.

11. The deployment monitoring system of claim 9 wherein the indicator portion has a predetermined length and the plurality of tinted sections are spaced apart from each other such that at least a portion of the light beam is reflected by at least one tinted section along the predetermined length.

12. The deployment monitoring system of claim 9 wherein at least one side of the first shaded section is disposed parallel to the second end.

13. The deployment monitoring system of claim 9 wherein at least one side of the second shaded section is disposed parallel to the second end.

14. The deployment monitoring system of claim 9 wherein at least one side of the first shaded section is disposed adjacent to the second shaded section.

15. The deployment monitoring system of claim 9 wherein the first shaded section is contiguous with a second shaded section.

* * * * *